March 28, 1961 J. R. FISHER ET AL 2,977,246
PROCESS FOR COATING FILM
Filed June 3, 1958
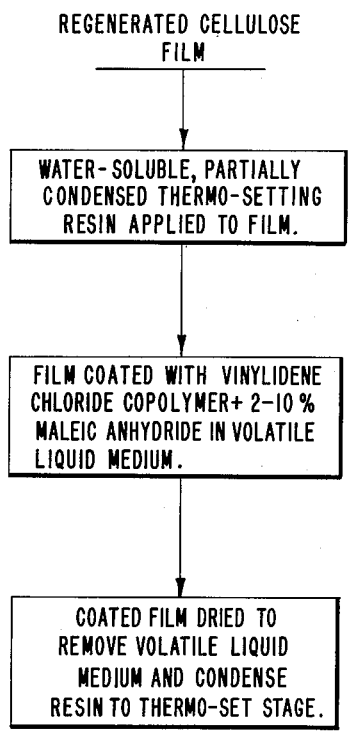
INVENTORS
JOHN RICHARD FISHER
HUGH ROSS JOHNSTONE
BY
ATTORNEY

United States Patent Office 2,977,246
Patented Mar. 28, 1961

2,977,246

PROCESS FOR COATING FILM

John Richard Fisher, Cheektowaga, and Hugh Ross Johnstone, North Tonawanda, N.Y., assignors to E. I. du Pont de Nemours and Company, Wilmington, Del., a corporation of Delaware Filed June 3, 1958, Ser. No. 739,467

5 Claims. (Cl. 117—76)

This invention relates to coated regenerated cellulose pellicular structures, and more particularly to improvements in the coating of regenerated cellulose film with vinylidene chloride copolymer coatings.

Vinylidene chloride copolymer coating on regenerated cellulose film are noted for their inherent moistureproofness. However, they are also noted for their poor adhesion or anchorage to the base film, particularly when the coated film is in contact for long periods of time with water or moisture or with products containing a large amount of moisture.

It is known to anchor moistureproofing and semi-moistureproofing coatings such as nitrocellulose-containing coatings to base films of regenerated cellulose by first incorporating in the base film a water-soluble, partially condensed thermosetting resin, and thereafter applying to the treated base film a moistureproofing or semi-moistureproofing composition containing a small amount of an acid polymerization catalyst, e.g., maleic acid, effective to promote condensation of the resin to the thermoset stage in the drying step of the coating process. However, attempts to anchor vinylidene chloride copolymer coatings to regenerated cellulose film containing a partially condensed thermosetting resin, by employing maleic acid in the coating composition, have met with failure because, for some unexplained reason, the moistureproofness of the coated film was adversely affected.

An object of the present invention, therefore, is to provide improved anchorage for vinylidene chloride copolymer coatings applied directly to base films of regenerated cellulose. Another object is to provide an improved process for anchoring vinylidene chloride copolymer coatings directly to regenerated cellulose base film through the agency of thermosetting resins, and without impairing the moistureproofness of the coating. A further object is to directly coat base film of regenerated cellulose with a vinylidene chloride copolymer moistureproofing coating under such conditions that the coating will adhere strongly to the base film. Still another object is to strongly adhere vinylidene chloride/acrylonitrile copolymer coating to base films of regenerated cellulose containing a thermosetting resin without adversely affecting the moistureproofness of the coating. These and other objects will more clearly appear from the description which follows.

Unexpectedly we have found that the addition of maleic anhydride to the vinylidene chloride copolymer coating composition gives a single coat film with good coating adhesion under conditions of high moisture, as well as satisfactory moisture permeability when the base film is first treated with any of the well-known anchoring resins.

Accordingly, the process of this invention, by which the foregoing objects are realized, comprises incorporating in the base film of regenerated cellulose a water-soluble, partially condensed thermosetting resin, coating the resulting film with a liquid coating composition comprised essentially of a vinylidene chloride copolymer and from about 2% to about 10% by weight of maleic anhydride, based on the weight of the copolymer, in a volatile liquid medium, and thereafter heating the coated film to remove said volatile liquid and to complete polymerization of said resin to the thermoset stage.

The invention is illustrated in the accompanying drawing wherein the single figure is a flow sheet depicting the steps of the process of the invention.

As the water-soluble, partially condensed thermosetting resin there may be employed any of the thermosetting synthetic resins heretofore employed as anchor agents for moistureproofing coatings on regenerated cellulose film including the partially condensed, water-soluble phenol-aldehyde and urea aldehyde resins disclosed in Charch and Bateman (U.S.P. 2,159,007), the guanidine-urea-formaldehyde resins of Chapman (U.S.P. 2,533,557), the melamine-formaldehyde resins of Pitzl (U.S.P. 2,432,542), the amine-modified urea-formaldehyde resins of Wooding (U.S.P. 2,546,575), the resins of Wooding (U.S.P. 2,688,570), of Wooding et al. (U.S.P. 2,646,368), of Wooding (U.S.P. 2,796,362), of Rosser (U.S.P. 2,699,406), etc.

The resin may be incorporated in the base film by any suitable method. A particularly convenient method is to include the partially condensed resin in the usual aqueous softener bath, e.g., an aqueous ethylene glycol bath, and impregnate the gel regenerated cellulose film with such bath followed by drying, all in the conventional manner. If desired, the resin may, of course, be applied to the already softened film in a separate bath. The concentration of resin in the bath and in the base film will be that normally employed for the resin as disclosed, for example, in the prior art patents cited above.

In addition to copolymers of vinylidene chloride and acrylonitrile which are preferred for purposes of this invention, other copolymers of vinylidene chloride which are useful for coating purposes are copolymers of vinylidene chloride/methacrylonitrile, vinylidene chloride/methyl acrylate, vinylidene chloride/ethyl acrylate, vinylidene chloride/butyl acrylate, vinylidene chloride/isobutyl acrylate, vinylidene chloride/methyl methacrylate, vinylidene chloride/ethyl methacrylate, vinylidene chloride/butyl methacrylate, vinylidene chloride/isobutyl methacrylate, vinylidene chloride/methyl vinyl ketone, vinylidene chloride/vinyl chloride, vinylidene chloride/vinyl acetate, vinylidene chloride/styrene, vinylidene chloride/dichlorovinylidene fluoride, vinylidene chloride/chloroprene, vinylidene chloride/butadiene, and vinylidene chloride/methoxyethyl methacrylate. Itaconic acid may be copolymerized with each of the above to give 3 component systems. Also useful are copolymers of vinylidene chloride/dimethyl itaconate, vinylidene chloride/diethyl itaconate, vinylidene chloride/dibutyl itaconate, vinylidene chloride/vinyl pyridine, and vinylidene chloride/isoprene. Generally, the copolymer should contain not less than 75% of vinylidene chloride.

The following examples will further serve to illustrate the principles and practice of this invention. In the examples, percentage are by weight unless otherwise indicated.

EXAMPLE 1

A water-soluble, partially condensed thermosetting resin was prepared as follows: 0.04 mol of guanidine nitrate was dissolved in 2.3 mols of formaldehyde in the form of a 37% formalin solution. The pH of the resultant solution was adjusted to 5.3 with aqueous 10% sodium hydroxide. One mol of urea was added and the mixture heated to boiling and refluxed for 2 hours. The resulting solution was cooled to room temperature and stabilized by adjusting the pH to 6.5–7.0 through the addition of aqueous sodium hydroxide (Example I, U.S.P. 2,533,557).

Regenerated cellulose film 0.0009" thick was impregnated with an aqueous softening bath containing sufficient ethylene glycol (softener) and the partially condensed resin, prepared as above described, to incorporate in the film approximately 18% ethylene glycol and 0.5% resin. The film was dried and thereafter coated, at the rate of 13.5% of coating solids per square meter of film, with a composition comprising a 90/10 vinylidene chloride/acrylonitrile copolymer (a copolymer containing 90% vinylidene chloride and 10% acrylonitrile) dissolved in a solvent mixture of 65% methyl ethyl ketone and 35% toluene, and 2% maleic anhydride, based on the weight of the polymer. The coated film was dried to remove solvent and to complete polymerization of the resin. The heat-seal strength and moisture permeability properties of the coated film are given in Table I.

*Heat-seal strength.*—Heat-seal strength is a measure of the strength of the bond between 2 films when they are sealed together by heat and pressure. For the purpose of comparison and definition, the following test is used to measure the strength of the heat-seal bond.

A piece of the coated film 4" by 10" with the grain running in the long direction is cut into pieces 4" x 5", handling all pieces by the corners so as not to contact the areas to be sealed. The 2 pieces of superimposed film are then sealed together at each end at right angles to the grain with a sealing bar ¾" wide heated to 150° C. at 20 p.s.i. pressure and ½ second contact time. The sealed sheets are then cut in half at right angles to the grain, and each half is cut into 1½" wide strips, parallel to the grain, from the center of the sheets resulting in 4 sets to be tested. Each set of the 1½" wide sealed strips, after being conditioned in the desired atmosphere, is opened at the free ends, placed in a Suter testing machine and pulled apart. The force in grams required to pull the strips apart is taken as a measure of the heat-seal bond strength.

*Moisture permeability (IPV).*—The determination of moistureproofness or moisture permeability is defined in U.S.P. 2,147,180 (Ubben). IPV is the initial permeability value of the film when first tested.

EXAMPLE 2

Same as Example 1 except that 2% maleic acid was used instead of 2% maleic anhydride. The results, given in Table I, show that the IPV of permeability value (moistureproofness) was adversely affected.

EXAMPLE 3

Same as Example 1 except that 5% maleic anhydride was used. The heat-seal and IPV were very good. See Table I.

EXAMPLE 4

Five percent maleic acid replaced the maleic anhydride of Example 3. The IPV was noticeably degraded in comparison with Example 3. See Table I.

EXAMPLE 5

Same as Example 1 but with 10% maleic anhydride. See Table I.

EXAMPLE 6

Same as Example 5 except that 10% maleic acid was used, to the extreme detriment of the heat seal and the IPV. See Table I.

EXAMPLE 7

This example shows the results obtained when neither maleic anhydride nor maleic acid was used. The heat seal (adhesion) was very poor. See Table I. Otherwise, same as Example 1.

EXAMPLES 8 AND 9

These examples show the comparison of 2% maleic anhydride with 5% maleic acid in the coating bath with the regenerated cellulose film being 0.0012" thick and containing 21% ethylene glycol. The base film was treated in the same manner as in Example 1. See Table I.

EXAMPLE 10

Regenerated cellulose film 0.0009" thick containing 16% glycerol and impregnated with the anchoring resin of Example 1 was coated with a similar coating composition containing 2.5 maleic acid. The results in Table I emphasize the adverse effect on IPV.

EXAMPLE 11

Regenerated cellulose film 0.0012" thick containing 18% glycerol and treated as in Example 1 was coated with a similar coating composition containing 2% maleic anhydride. A distinct improvement in IPV was obtained. See Table I.

EXAMPLE 12

Regenerated cellulose film 0.0009" thick containing 17% ethylene glycol was impregnated with 0.5% of a melamineformaldehyde polyalkylenepolyamine resin, such as described in Wooding, U.S.P. 2,796,362 ("Accobond" 3900—American Cyanamid Company) and was then coated with a composition comprising a 90/10 vinylidene chloride/acrylonitrile copolymer dissolved in a solvent mixture of 65% methyl ethyl ketone and 35% toluene and 2% maleic anhydride, based on the weight of the copolymer. The resulting heat seal and moistureproofness were good. See Table I.

*Table I*

| Example | Maleic Anhydride, percent | Maleic Acid, percent | Heat Seal, 35% R.H. | IPV |
| --- | --- | --- | --- | --- |
| 1 | 2 | | 234 | 89 |
| 2 | | 2 | 381 | 339 |
| 3 | 5 | | 459 | 66 |
| 4 | | 5 | 290 | 415 |
| 5 | 10 | | 420 | 149 |
| 6 | | 10 | 98 | 795 |
| 7 | | | 61 | 270 |
| 8 | 2 | | 234 | 74 |
| 9 | | 5 | 162 | 368 |
| 10 | | 2.5 | 182 | 344 |
| 11 | 2 | | 250 | 45 |
| 12 | 2 | | 348 | 45 |

We claim:

1. A process for coating regenerated cellulose film which comprises applying to in regenerated cellulose film a water-soluble, partially condensed thermosetting resin; thereafter coating the resulting film with a composition comprising in volatile liquid medium a vinylidene chloride copolymer and from about 2% to about 10% by weight, based on the weight of copolymer, of maleic anhydride; and drying the coated film to remove the volatile liquid and complete condensation of said resin to the thermoset stage.

2. A process for coating regenerated cellulose film which comprises applying to in regenerated cellulose film a water-soluble, partially condensed thermosetting resin; thereafter coating the resulting film with a composition comprising in volatile liquid medium a vinylidene chloride/acrylonitrile copolymer and from about 2% to about 10% by weight, based on the weight of copolymer, of maleic anhydride; and drying the coated film to remove the volatile liquid and complete condensation of said resin to the thermoset stage.

3. A process for coating regenerated cellulose film which comprises applying to in regenerated cellulose film a water-soluble, partially condensed thermosetting resin; thereafter coating the resulting film with a composition comprising a volatile organic solvent having dissolved therein a copolymer of vinylidene chloride and acrylonitrile in the weight ratio of 90% vinylidene chloride to 10% of acrylonitrile, and from about 2% to about 10% by weight, based on the weight of copolymer, of maleic anhydride; and drying the coated film to remove solvent and to complete condensation of said resin to the thermoset stage.

4. The process of claim 3 wherein said water-soluble, partially condensed thermosetting resin is a guanidine-urea-formaldehyde resin.

5. The process of claim 3 wherein said water-soluble, partially condensed thermosetting resin is a malamine-formaldehyde-polyalkylenepolyamine resin.

References Cited in the file of this patent

UNITED STATES PATENTS

| | | |
|---|---|---|
| 2,684,919 | Berry | July 27, 1954 |
| 2,725,308 | Nickerson | Nov. 29, 1955 |
| 2,805,173 | Ambler | Sept. 3, 1957 |